Jan. 6, 1970  H. P. KIEDROWSKI  3,487,872
TIRE TRIMMER

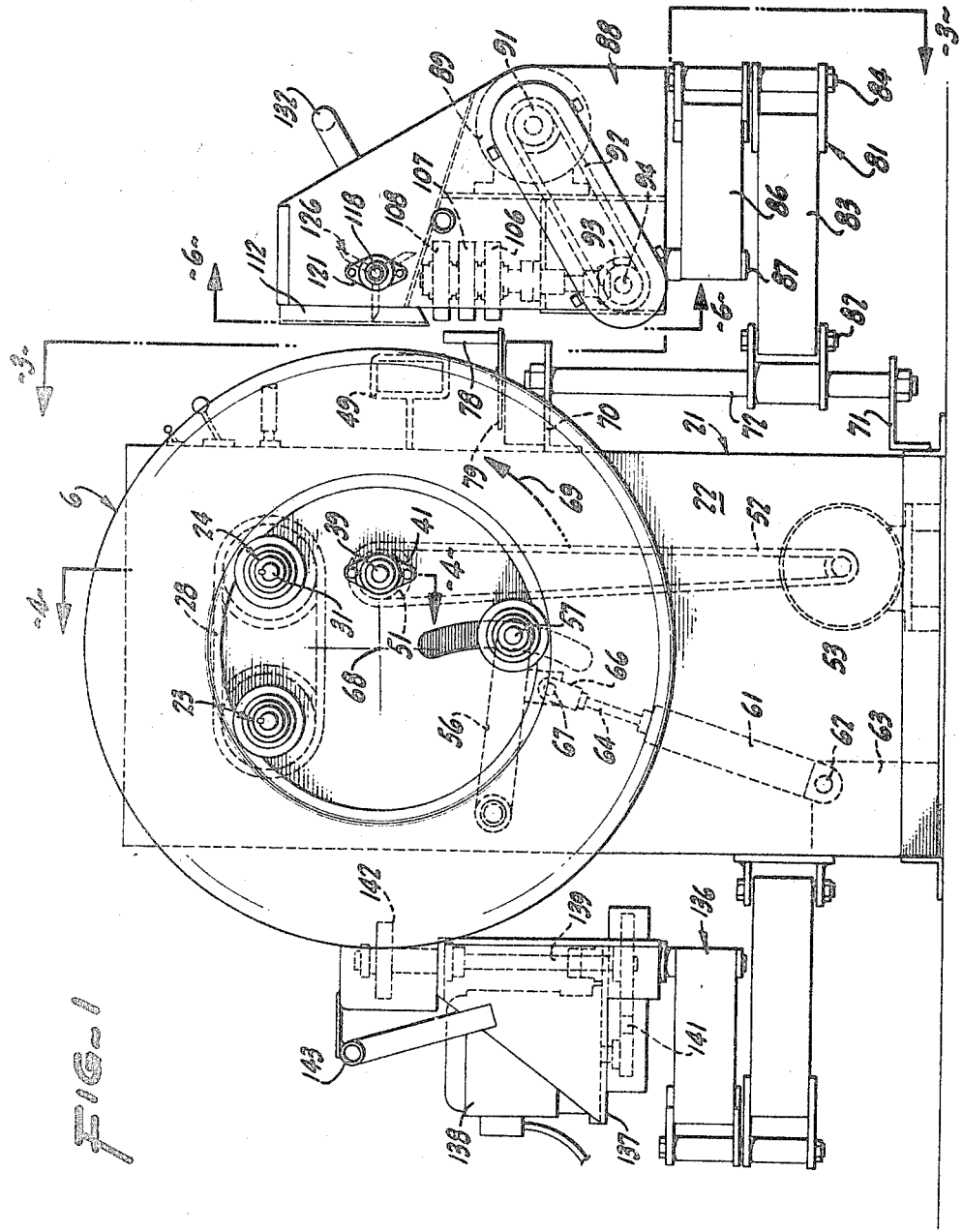

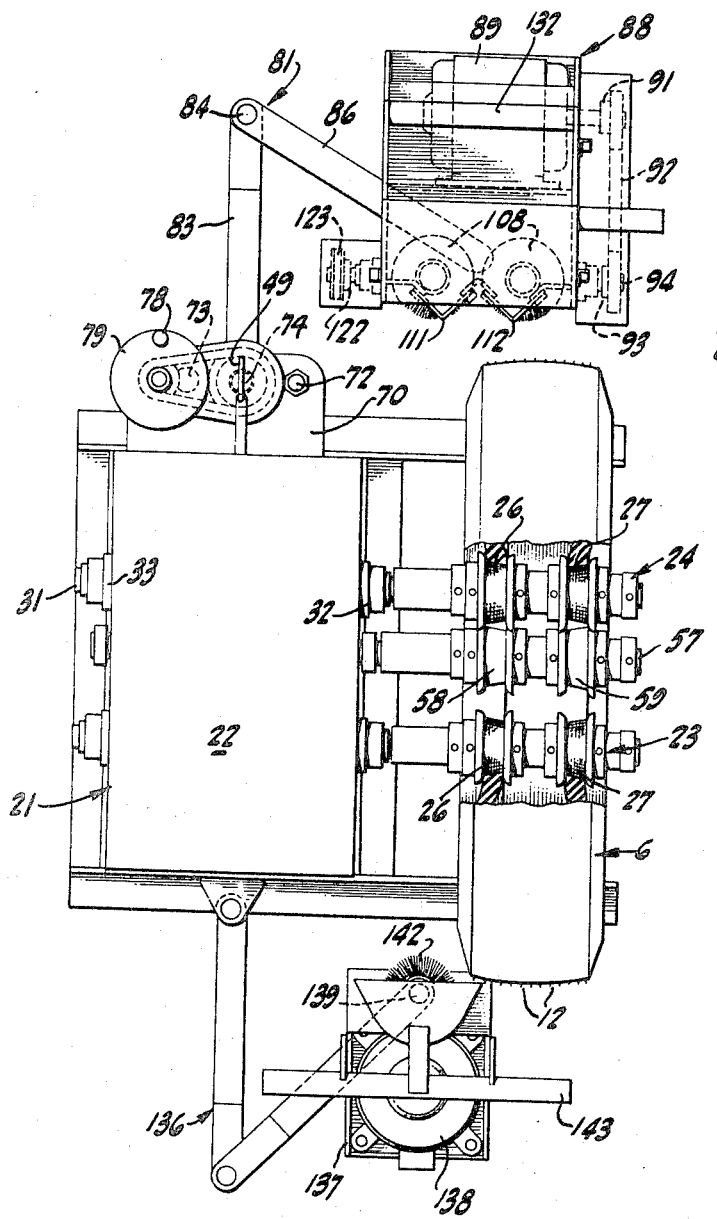

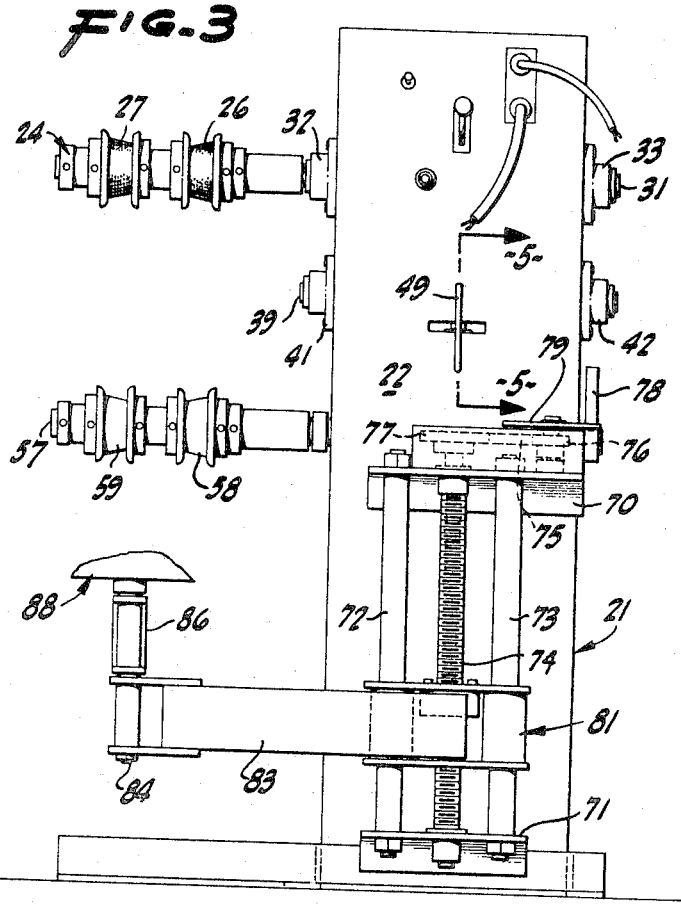
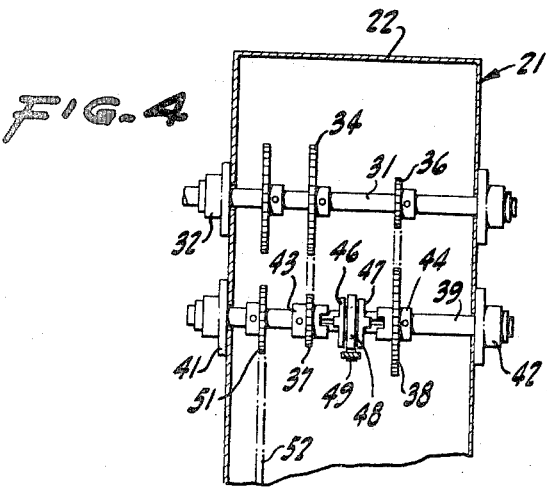
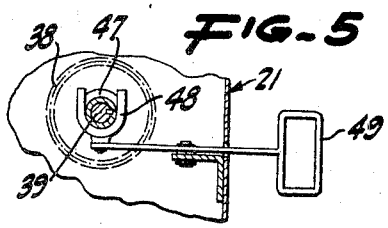

Filed Aug. 7, 1967

INVENTOR
HUGH P. KIEDROWSKI
BY Lothrop & West
ATTORNEYS

United States Patent Office 3,487,872
Patented Jan. 6, 1970

3,487,872
TIRE TRIMMER
Hugh P. Kiedrowski, 213 S. Kelly,
Lodi, Calif. 95240
Filed Aug. 7, 1967, Ser. No. 658,802
Int. Cl. B29h 21/00
U.S. Cl. 157—13
9 Claims

ABSTRACT OF THE DISCLOSURE

A tire trimmer rotatably supports a tire casing having unwanted, rubber-like protrusions thereon and includes brushes for flexing the protrusions into an outstanding position and knives for cutting off the flexed protrusions as the tire casing rotates.

---

To prolong the life of tire casings, particularly truck casings after the original tread has largely been worn off, the casing is recapped. A strip of camelback is positioned around the tread portion and the casing is put into a vulcanizing mold. Some of the camelback extrudes from the mold through more or less radial channels in the original tread pattern especially in the vicinity of the tread shoulders. Some of the camelback extrudes through vent openings in the mold. The extrusions are vulcanized in place and appear on the recapped casing. The various vent projections and inter-tread protrusions are not wanted, but it requires a long time to remove them manually from both shoulders and from the new tread of the recapped casing.

It is therefore an object of my invention to provide a tire trimmer to remove unwanted protrusions in a very few moments, leaving the tire in improved condition and with a more attractive appearance.

Another object of the invention is to provide a tire trimmer which can readily be operated by labor ordinarily available in a tire capping shop.

Another object of the invention is to provide a tire trimmer which will uniformly and satisfactorily remove all of the unwanted protrusions.

Another object of the invention is to provide a device for removing unwanted protrusions on tire casings of various sizes and contours.

Other objects together with the foregoing are attained in the embodiment of the invention described in the accompanying description and illustrated in the accompanying drawings, in which:

FIGURE 1 is a front elevation of a tire trimmer constructed pursuant to the invention;

FIGURE 2 is a plan of the tire trimmer shown in FIGURE 1 with a portion of a tire casing thereon removed to disclose the machine construction;

FIGURE 3 is a view taken on the plane 3—3 of FIGURE 1 showing in general a side elevation of the tire trimmer;

FIGURE 4 is a cross section, the plane of which is indicated by the line 4—4 of FIGURE 1;

FIGURE 5 is a cross sectional detail, the plane of which is indicated by the line 5—5 of FIGURE 3;

Figure 6:
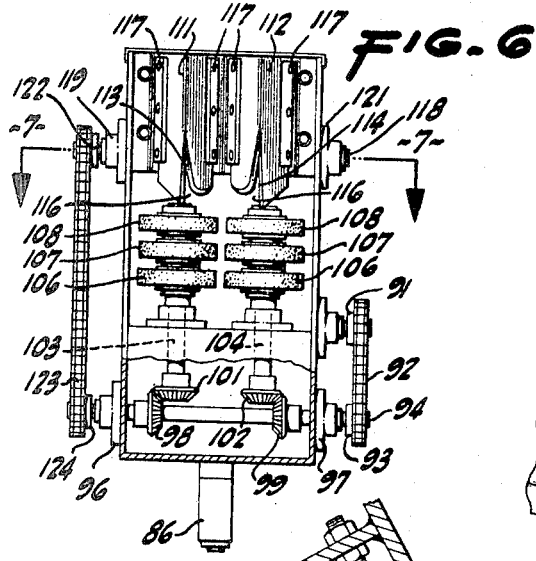
FIGURE 6 is an end elevation taken on the plane 6—6 of FIGURE 1.
Figure 9:
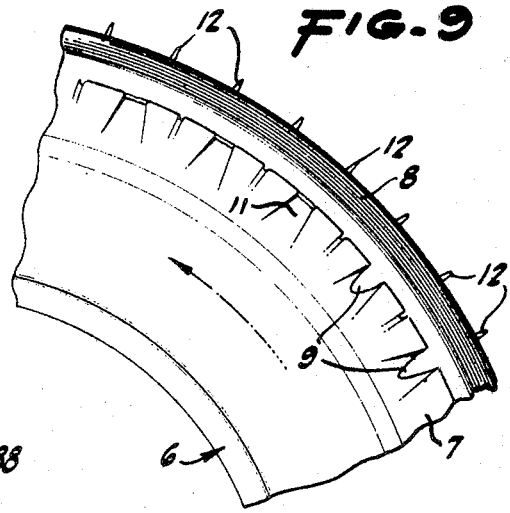
FIGURE 9 is a side elevation of a portion of a tire casing showing the appearance of the unwanted shoulder projections as they initially occur and the appearance of the casing after the unwanted shoulder projections have been removed.

As particularly illustrated in FIGURE 9, a tire casing 6 has a shoulder 7 on each side bounding a central tread 8. After a renewed tread or recap has been vulcanized, there remain tabs or protrusions 9 extending from the tread into interstices 11 in the original tread pattern principally in the vicinity of the casing shoulders. Additionally, since the tread mold has a number of cylindrical or conical vents in it, there are likewise some vent projections 12 extending from the new tread surface.

In order that these unwanted protrusions may readily be removed, I provide a tire trimmer that has been satisfactorily operated in extensive commercial practice. The machine comprises a frame 21 including an appropriate base or stand and a cabinet portion 22 within which much of the associated machinery is disposed.

Suitably supported on the frame within the cabinet are driven spindles 23 and 24 mounted in suitable bearings and extending to one side of the cabinet to carry drive cones 26 and 27. The spindles 23 and 24 are linked by a drive chain 28 and are rotated in the same direction. The shaft 31 of the extended spindle 24 between bearings 32 and 33 in the frame 21 is provided with a pair of sprockets 34 and 36 of different diameters. These are respectively in alignment with sprockets 37 and 38 also of different diameters freely rotatable on a lay shaft 39 held in bearings 41 and 42 on the frame 21. The sprockets 37 and 38 are kept from axial translation by collars 43 and 44 pinned to the shaft 39 and may be engaged by the related one of two dog clutch members 46 or 47 forming part of a shifter 48 operated by a lever 49 pivoted vertically on the frame 21.

The shaft 39 also carries a driven sprocket 51 joined by a chain 52 to a drive motor 53 mounted at the bottom of the frame 21. With this drive train, when the motor 53 is energized, there is no power transmitted to either of the spindles 23 or 24 until the operator moves the lever 49 and engages one or the other of the dog clutches. Whichever one is engaged causes rotation of the shaft 31 at a corresponding speed and by means of the chain 28 uniform rotation of the two spindles 23 and 24. In this fashion, the drive cones 26 and 27 on the two spindles are selectively rotated at either one of two speeds, depending upon whether the tire to be trimmed is relatively large or relatively small in diameter. A large tire is rotated at a smaller angular velocity than a small tire so that the rim speeds are approximately the same efficient amount.

A tire casing 6 disposed with the casing beads resting on the cones can be frictionally driven due to the weight of the tire, but preferably an additional centering and pressuring means is provided. For that reason, a swinging arm 56 is pivoted on the frame 21 and carries an idler shaft 57 on the outer end of which a pair of idler cones 58 and 59 are rotatably supported. One end of a jack cylinder 61 is connected by a pivot 62 to a bracket 63 forming part of the frame 21. The cylinder is piped to a suitable source of valve-controlled motive fluid. A piston rod 64 projecting from the cylinder has a clevis 66 joined by a pivot 67 to the arm 56. When the operator contracts the jack 61, the idler cones 58 and 59 are moved radially outward and engage the beads of the tire casing. This serves not only to increase the interengagemnt pressure between the driving cones 26 and 27 and the casing beads, but likewise positions the casing to run closely centered on a horizontal rotational axis 68. When the mechanism operates, the casing 6 is rotated smoothly and uniformly, preferably in the direction of the arrow 69 in FIGURE 1.

To deal with the protrusions 9, I provide a special mechanism. On one side of the frame 21 brackets 70 and 71 are provided and are joined by cylindrical guides 72 and 73. A screw shaft 74 is journalled in the brackets 70 and 71. A chain 75 joins a sprocket 77 on the shaft 74 to a sprocket 76 on a crank 79 provided with an external crank arm 78.

Slidably disposed on the guides 72 and 73 and engaging the screw shaft 74 is a vertically movable carriage 81. When the crank 79 is rotated, the carriage 81 is moved up or down, always moving parallel to itself, to any desired elevation. The carriage 81 has a pivot bolt 82 (FIGURE 1) from which a swinging arm 83 is extended. At the end of the arm a similar pivot bolt 84 rises to serve as a mount for a second swinging arm 86. With both such arms pivotally mounted with respect to the carriage 81, a support pin 87 at the outboard end of the arm 86 can be readily moved by the user into virtually any selected position and at any elevation.

Pivotally sustained by the support pin 87 is a subframe 88 carrying a second electric motor 89 on its drive shaft having a sprocket 91. This is connected by a chain 92 to a driven sprocket 93 on a cross shaft 94 mounted in bearings 96 and 97 in the subframe. Borne by the cross shaft 94 are bevel pinions 98 and 99 engaging corresponding pinions 101 and 102 at the base of a pair of vertical shafts 103 and 104 suitably journalled in the subframe 88.

The shafts 103 and 104 are duplicates of each other but rotate in opposite directions. A description of one applies to the other. The shaft 103 adjacent its upper end carries a series of wire brushes 106, 107 and 108. These are of customary construction and have a plurality of individual wires extending radially from a hub encompassing the shaft 103. When the motor 89 is energized, both shafts 103 and 104 turn and their respective series of brushes 106, 107 and 108 rotate in opposite directions with the brush periphery near the casing moving toward the tread center.

Mounted on the subframe approximately parallel with each of the shafts 103 and 104 are knives 111 and 112. Each of the knives includes a pair of dihedral plates defining angled cutting edges 113 and 114 contoured to provide an upwardly converging slot 116. The position of the knife plates is such that at least one of them is approximately but not exactly tangentially disposed with respect to the adjacent surface of the tire casing (see FIGURE 7). The knives are separately fastened by securing means 117 so that they can from time to time be removed, sharpened and replaced.

Figure 8:
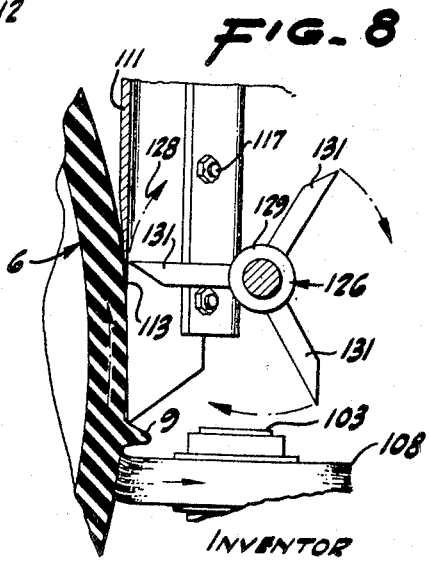
FIGURE 8 is a cross section, the plane of which is indicated by the line 8—8 of FIGURE 7.

As an adjunct to the described mechanism, there is mounted on the subframe a cross shaft 118 carried by appropriate bearings 119 and 121 so as to be parallel to the shaft 94. A sprocket 122 at one end of the shaft 118 is connected by a chain 123 to a sprocket 124 at the end of the shaft 94. When the motor 89 is energized, the shaft 118 rotates. On the shaft 118 is mounted a pressing wheel 126 for the knife 111 and a pressing wheel 127 for the knife 112. The plane of rotation of each pressing wheel is substantially the central plane of the adjacent knife and is offset from the axis of the adjacent brush shaft. The direction of operation of the pressing wheels is as indicated by the arrow 128 in FIGURE 8; that is, toward the converging knife blades. Each pressing wheel includes a central hub 129 from which radial fingers 131 extend. In the present instance, these are three in number and are pointed to come very close to the surface of the tire casing but miss the sharp edges of the adjacent knife edges.

Figure 7:
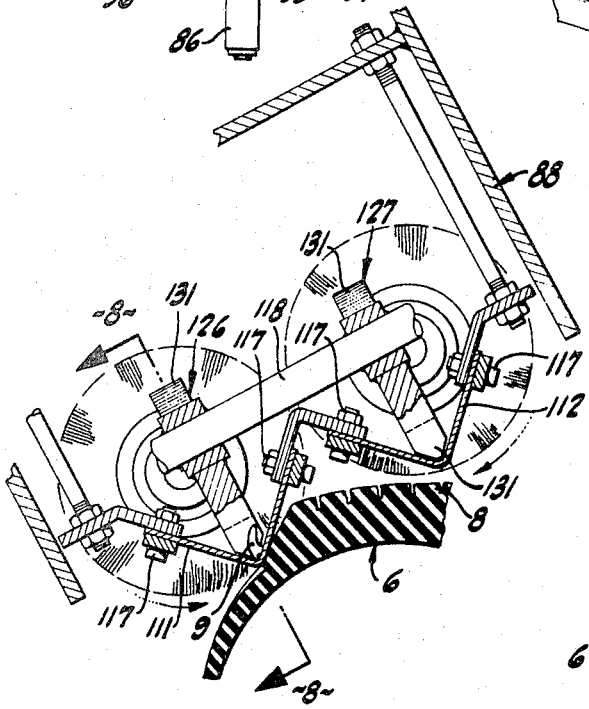
FIGURE 7 is a cross section to an enlarged scale, the plane of which is indicated by the line 7—7 of FIGURE 6.

In the operation of this portion of the structure with the tire casing in position and rotating, the motor 89 is energized. By grasping a handle 132 (FIGURE 1), the user moves the subframe 88 about the various pivots until such time as one of the series of brushes 106, 107 and 108 is in immediate abutment with the shoulder or side of the casing and the other series of brushes is adjacent to but spaced from the center of the tread portion. The abutting brushes engage and lift or flex outwardly one or more of the adjacent protrusions 9 and keep them outstanding from the casing of the tire, as illustrated in FIGURE 7. The brushes cause the protrusions to be lifted and held in lifted position as the casing rotates and the protrusions rise into the converging spaces between the cutting edges of the active knife. The protrusions or tabs are cut off. Movement of the lifted or flexed protrusions into the converging slot in the knife is assured by the force of the adjacent rotating pressing wheel fingers 131. The lifted and severed protrusions or tabs fall away from the casing.

When the casing has been revolved through one revolution and the brushes and knives on one side effectively have removed the protrusions from that shoulder, the operator grasps the handle 132 and rocks the subframe on its mounting so that the other set of brushes 106, 107 and 108 engage with the protrusions on the other shoulder of the casing. These are similarly treated. In this fashion both sides of the tire casing adjacent the shoulders are cleaned of the unwanted protruding rubber-like members.

The machinery as described can be used to cut off the vent projections 12 as well, but I prefer to augment the trimmer by providing a special structure for this purpose. A similar mounting 136 is disposed on the opposite side of the frame 21 and supports a subframe 137 on which an electric motor 138 is mounted. This motor drives a vertical shaft 139 through a chain 141. A stiff brush wheel 142 at the upper end of the shaft 139 is maneuvered against the surface of the tire tread by an operator grasping a handle 143. The wire brush abrades or cuts off the protruding vent projections 12.

What is claimed is:

1. A tire trimmer comprising a frame, means on said frame for supporting a tire casing concentric with an axis, said tire casing having an unwanted rubber-like protrusion thereon, means on said frame for engaging and flexing said protrusion to provide a lifted portion thereof, said engaging and flexing means being a rotary brush mechanism, a knife, and means on said frame for relatively moving said knife and said lifted portion to sever said lifted portion.

2. A tire trimmer as in claim 1 including means for rotating said tires casing about said axis.

3. A tire trimmer as in claim 2 including means for holding said knife non-rotatably on said frame.

4. A tire trimmer as in claim 1 in which means are provided for mounting a rotary brush in said brush mechanism for rotation of the periphery of said brush closest to said tire casing in a direction radially away from said axis.

5. A tire trimmer as in claim 2 in which said knife includes a pair of cutting edges converging on said lifted portion in the direction of rotation of said tire casing.

6. A tire trimmer as in claim 5 including means for urging said lifted portion toward said cutting edges.

7. A tire trimmer as in claim 4 including means on said frame for supporting said brush for bodily movement to engage either shoulder of said tire casing.

8. A tire trimmer as in claim 4 in which said brush mechanism includes a pair of brushes, one for each side of said tire casing, and in which said knife includes a plurality of pairs of cutting edges, one pair for each side of said tire casing.

9. A tire trimmer as in claim 2 including means separate from said rotating means for operating said engaging and flexing means.

References Cited

UNITED STATES PATENTS

| | | | |
|---|---|---|---|
| 2,034,662 | 3/1936 | McLaughlin et al. | 157—13 |
| 2,603,290 | 7/1952 | Lindemann | 157—13 |

GRANVILLE Y. CUSTER, JR., Primary Examiner